United States Patent
Wang et al.

(10) Patent No.: US 12,223,407 B2
(45) Date of Patent: Feb. 11, 2025

(54) EFFICIENT CONFIGURATION SELECTION FOR AUTOMATED MACHINE LEARNING

(71) Applicant: Microsoft Technology Licensing, LLC, Redmond, WA (US)

(72) Inventors: Chi Wang, Redmond, WA (US); Silu Huang, Urbana, IL (US); Surajit Chaudhuri, Redmond, WA (US); Bolin Ding, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 651 days.

(21) Appl. No.: 16/110,419

(22) Filed: Aug. 23, 2018

(65) Prior Publication Data

US 2020/0065712 A1 Feb. 27, 2020

(51) Int. Cl.
*G06N 20/20* (2019.01)
*G06F 9/445* (2018.01)
*G06N 20/00* (2019.01)

(52) U.S. Cl.
CPC ......... *G06N 20/20* (2019.01); *G06F 9/44505* (2013.01); *G06N 20/00* (2019.01)

(58) Field of Classification Search
CPC ..... G06N 20/00; G06N 20/20; G06F 9/44505
See application file for complete search history.

(56) References Cited

U.S. PATENT DOCUMENTS

| 2005/0288871 A1* | 12/2005 | Duffy ............... G16C 20/70 702/27 |
| 2014/0172753 A1 | 6/2014 | Nowozin et al. |
| 2017/0046839 A1* | 2/2017 | Paik ............... G06V 10/84 |

OTHER PUBLICATIONS

Gang Luo. A Review of Automatic Selection Methods for Machine Learning Algorithms and Hyperparameter Values. 2016. Utah.edu (Year: 2016).*
Lisha Li, Kevin Jamieson, Giulia DeSalvo, Afshin Rostamizadeh, Ameet Talwalkar. Hyperband: A Novel Bandit-Based Approach to Hyperparameter Optimization. 2018. Journal of Machine Learning Research (Year: 2018).*
Rosa L Figueroa, Qing Zeng-Treitler, Sasikiran Kandula and Long H Ngo. Predicting sample size required for classification performance. 2012. BMC Medical Informatics and Decision Making (Year: 2012).*
Poh et al, "Estimating the Confidence Interval of Expected Performance Curve in Biometric Authentication Using Joint Bootstrap", 2007, 2007 IEEE International Conference on Acoustics, Speech and Signal Processing, pp. 137-140. (Year: 2007).*
Smith et al, "Making early predictions of the accuracy of machine learning classifiers", 2012, Learning in Non-Stationary Environments, p. 131. (Year: 2012).*

(Continued)

*Primary Examiner* — Alexey Shmatov
*Assistant Examiner* — Clint Mullinax
(74) *Attorney, Agent, or Firm* — Schwegman Lundberg & Woessner, P.A.

(57) ABSTRACT

In automated machine learning, an approximate best configuration can be selected among multiple candidate machine-learning configurations by progressively sampling training and test datasets for the iterative training and testing of the configurations while progressively pruning the set of candidate configurations based on associated estimated confidence intervals for their respective performance.

20 Claims, 7 Drawing Sheets

(56) References Cited

OTHER PUBLICATIONS

Shibagaki et al, "Regularization Path of Cross-Validation Error Lower Bounds", 2015, Advances in Neural Information Processing Systems 28 (NIPS 2015), pp. 1-9. (Year: 2015).*
Bergstra, et al., "Algorithms for Hyper-Parameter Optimization", In Proceedings of the 25th International Conference on Neural Information Processing Systems, Dec. 12, 2011, 09 Pages.
Bergstra, et al., "Random Search for Hyper-Parameter Optimization", In Journal of Machine Learning Research, vol. 13, Feb. 2012, pp. 281-305.
Bousquet, et al., "Stability and Generalization", In Journal of Machine Learning Research vol. 2, Mar. 2002, pp. 499-526.
Eggensperger, et al., "Towards an Empirical Foundation for Assessing Bayesian Optimization of Hyperparameters", In Proceedings of NIPS Workshop on Bayesian Optimization in Theory and Practice, Dec. 10, 2013, pp. 1-5.
Elomaa, et al., "Progressive Rademacher Sampling", In Proceedings of the Fourteenth Annual Conference on Innovative Applications of Artificial Intelligence, Jul. 28, 2002, pp. 140-145.
Feurer, et al., "Efficient and Robust Automated Machine Learning", In Proceedings of Annual Conference on Neural Information Processing Systems, Dec. 7, 2015, 09 Pages.
Hazan, et al., "Hyperparameter Optimization: A Spectral Approach", In Proceedings 6th International Conference on Learning Representations, Apr. 30, 2018, pp. 1-18.
Huang, et al., "Efficient Identification of Approximate Best Configuration of Training in Large Datasets", In Proceedings of the AAAI Conference on Artificial Intelligence, Jul. 17, 2019, pp. 3862-3869.
Hutter, et al., "Sequential Model-Based Optimization for General Algorithm Configuration", In Proceedings of International Conference on Learning and Intelligent Optimization, Jan. 17, 2011, 15 Pages.
Jamieson, et al., "Non-stochastic Best Arm Identification and Hyperparameter Optimization", In Proceedings of the 19th International Conference on Artificial Intelligence and Statistics, May 9, 2016, pp. 240-248.
Klein, et al., "RoBO: A Flexible and Robust Bayesian Optimization Framework in Python", In Proceedings of 31st Conference on Neural Information Processing Systems, Dec. 2017, 05 Pages.
Koltchinskii, et al., "Improved Sample Complexity Estimates for Statistical Learning Control of Uncertain Systems", In Journal of IEEE Transactions on Automatic Control, vol. 45, Issue 12, Dec. 2000, pp. 2383-2388.
Li, et al., "Hyperband: A Novel Bandit-Based Approach to Hyperparameter Optimization", In Journal of Machine Learning Research, vol. 18, Issue 1, Apr. 2018, pp. 1-52.
Olson, et al., "Evaluation of a Tree-based Pipeline Optimization Tool for Automating Data Science", In Proceedings of the Genetic and Evolutionary Computation Conference, Jul. 20, 2016, pp. 485-492.
Pedregosa, et al., "Scikit-learn: Machine Learning in Python", In Journal of Machine Learning Research, vol. 12, Oct. 2011, pp. 2825-2830.
Provost, et al., "Efficient Progressive Sampling", In Proceedings of the Fifth ACM SIGKDD International Conference on Knowledge Discovery and Data mining, Aug. 1, 1999, pp. 23-32.
Rasley, et al., "HyperDrive: Exploring Hyperparameters with POP Scheduling", In Proceedings of the 18th ACM/IFIP/USENIX Middleware Conference, Dec. 11, 2017, pp. 1-13.
Snoek, et al., "Practical Bayesian Optimization of Machine Learning Algorithms", In the Proceedings of the International Conference on Neural Information Processing Systems, Dec. 3, 2012, 09 Pages.
Sparks, et al., "Automating Model Search for Large Scale Machine Learning", In Proceedings of Sixth ACM Symposium on Cloud Computing, Aug. 27, 2015, pp. 308-380.
Thornton, et al., "Auto-WEKA: Combined Selection and Hyperparameter Optimization of Classification Algorithms", In the Proceedings of the 19th ACM SIGKDD international conference on Knowledge discovery and data mining, Aug. 11, 2013, pp. 847-855.
Vanschoren, et al., "Openml: Networked Science in Machine Learning", In Journal of ACM SIGKDD Explorations Newslettervol. 15, Issue 2, Jun. 16, 2014, pp. 49-60.
Vapnik, Vladimir N., "An Overview of Statistical Learning Theory", In Journal of IEEE Transactions on Neural Networks, vol. 10, No. 5, Sep. 1999, pp. 988-999.
Zhou, Ding-Xuan, "The Covering No. in Learning Theory", In Journal of Complexity, vol. 18, Issue 3,, Sep. 2002, pp. 739-767.
"International Search Report and Written Opinion Issued in PCT Application No. PCT/US2019/039680", Mailed Date: Sep. 30, 2019, 12 Pages.
Mund, Sumit, "Microsoft Azure Machine Learning", In Publication of Packt Publishing Ltd., Jun. 15, 2015, 212 Pages.
"Office Action Issued in Indian Patent Application No. 202117005423", Mailed Date: Nov. 23, 2022, 8 Pages.
"Office Action Issued in European Patent Application No. 19740268.8", Mailed Date: Apr. 21, 2023, 7 Pages.
Office Action Received for Chinese Application No. 201980054858.7, mailed on Jul. 15, 2024, 13 Pages (English Translation Provided).

* cited by examiner

EFFICIENT CONFIGURATION SELECTION FOR AUTOMATED MACHINE LEARNING

TECHNICAL FIELD

The disclosed subject matter relates to the field of automated machine learning, that is, the automated training and testing of multiple machine-learning configurations for the purpose of identifying an optimal or near-optimal configuration.

BACKGROUND

The creation of a machine-learning solution for a new predictive task or dataset generally involves the selection of a suitable machine-learning model and/or learning algorithm from among a plurality of possible models/algorithms (e.g., linear or logistic regression, support vector machines, decision trees and random forests, artificial neural networks), the setting of associated hyperparameters, as well as a choice among multiple ways of preprocessing and featurizing the data provided as input to the model/algorithm. Collectively, the combination of data-preprocessing/featurizing, model/algorithm, and hyperparameter selections is herein also referred to as a "machine-learning configuration."

The performance of a machine-learning solution to a predictive task is highly dependent on the selected machine-learning configuration. Therefore, data scientists often spend a significant amount of time to train and test many possible configurations and identify the optimal configuration among them. This process can involve tens or hundreds of trials. While various tools have been developed to automate these trials, both manual and automated approaches have become increasingly time-consuming due to ever-growing datasets. The trial for just a single configuration can take hours or days for a large-scale dataset. Accordingly, a more efficient approach to selecting a suitable machine-learning configuration from among a set of possible configurations is desirable.

SUMMARY

Described herein is an approach to automated machine learning that generally involves training and testing a set of candidate machine-learning configurations (herein also "candidate set") over a sampled—rather than the full—dataset to iteratively identify an optimal or near-optimal configuration. This identified configuration is herein also referred to as the "approximate best configuration." In various embodiments, upon training and testing a selected configuration over a sampled dataset, associated training and test accuracies (or training and test values of some other quality metric for the trained configuration) are used to estimate a confidence interval (i.e., upper and lower confidence bounds) of the real performance of the configuration if trained and tested on the full dataset. Comparisons between the estimated confidence bounds associated with the various configurations are used to progressively "prune" the candidate set by removing low-performing configurations. Further, the confidence intervals are iteratively refined by progressively increasing the sample size for the repeated training and testing of any given configuration. The iterative training, testing, and pruning process may continue until only a single configuration remains within the candidate set; this remaining configuration constitutes the approximate best configuration and may be trained on the full dataset to optimize its performance. In various embodiments, the manner in which the pruning and computation of confidence intervals are performed ensures that, with a specified minimum probability, the accuracy (or other quality metric) of the approximate best configuration is within a specified loss tolerance of the accuracy (or other quality metric) of the "true best" (i.e., optimal) configuration.

Beneficially, the progressive sampling and pruning strategy described herein enables identifying approximate best machine-learning configurations in significantly less time than it would take to determine, via exhaustive training and testing on the full dataset, the true best configuration. For example, in some embodiments, the approximate best configuration can be identified tens or hundreds of times faster with accuracy losses of no more than 1%.

BRIEF DESCRIPTION OF THE DRAWINGS

The foregoing will be more readily understood from the following detailed description of various embodiments, in particular, when taken in conjunction with the accompanying drawings.

DETAILED DESCRIPTION

Described herein are systems, methods, and computer-program products (as embodied in machine-readable media) for the efficient automated selection of a machine-learning configuration from a candidate set of configurations using progressive sampling for the iterative training and testing of the candidate configurations in conjunction with progressive, confidence-interval-based pruning of the candidate set. In various embodiments, the ultimately selected machine-learning configuration is an approximate best configuration, that is, a configuration that achieves optimal performance or near-optimal performance (as defined in a probabilistic sense according to some specified criterion or criteria) as compared with other configurations within the candidate set.

Figure 1:
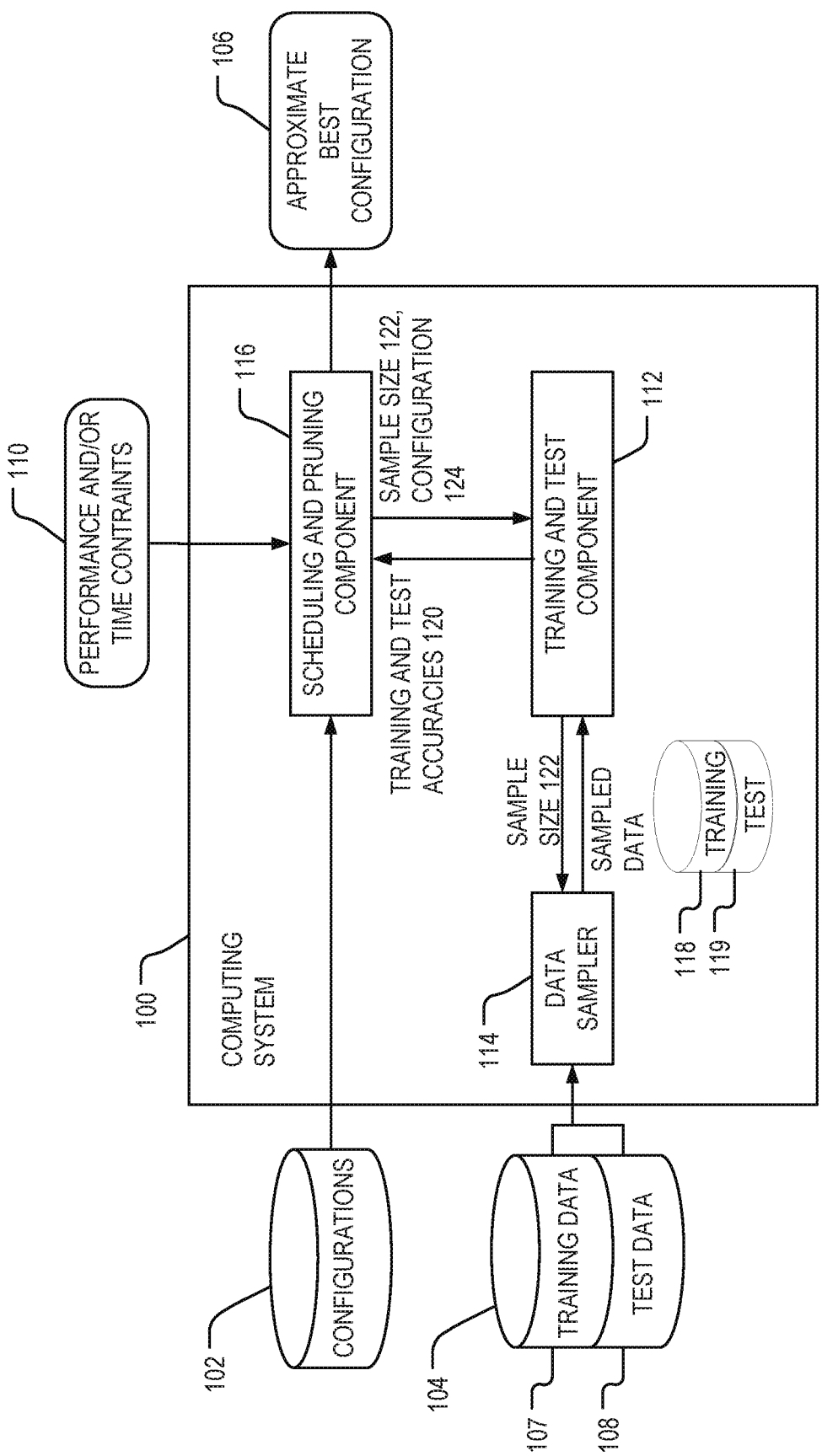
FIG. 1 is a schematic block diagram illustrating a system for the efficient automated determination of an approximate best machine-learning configuration, in accordance with various embodiments.
Figure 6:
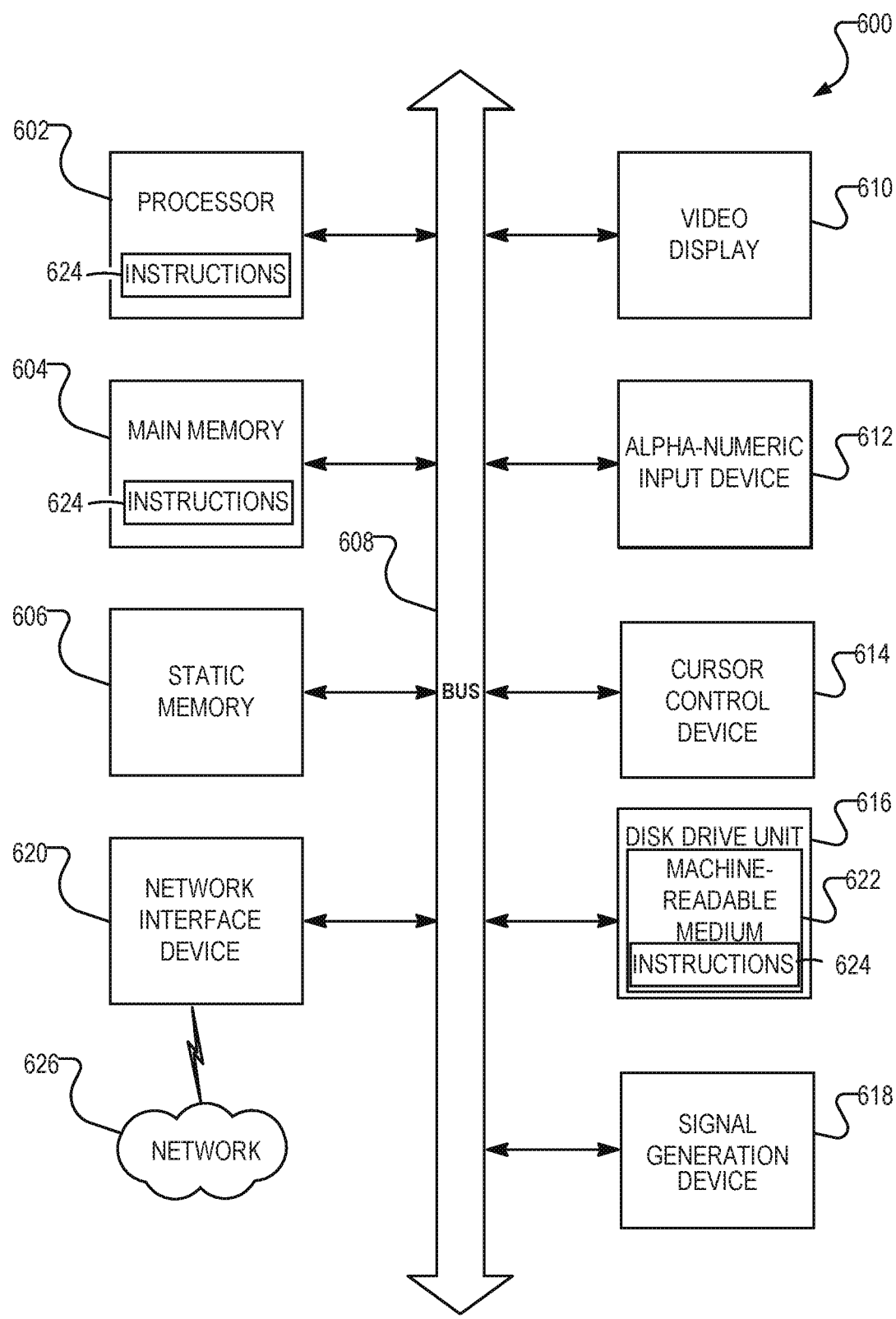
FIG. 6 is a block diagram of an example computing system as may be used to implement the system of FIG. 1, in accordance with various embodiments.

FIG. 1 illustrates an example computing system 100 for the efficient automated determination of an approximate best machine-learning configuration, in accordance with various embodiments. The computing system 100 can be implemented with a suitable combination of hardware and/or software, and generally includes one or more suitably configured or programmed hardware processors (such as central processing units (CPUs), graphic processing units (GPUs), digital signal processors (DSPs), field-programmable gate arrays (FPGAs), application-specific integrated circuits (ASICs), etc.). In various embodiments, the computing system 100 is a general-purpose computer, e.g., as illustrated in FIG. 6, or a cluster of multiple such computers intercommunicating via a network. In brief, the computer or cluster includes one or more CPUs and/or GPUs, as well as (volatile and/or non-volatile) memory storing data and program code for execution by the CPU(s) and/or GPU(s). The computer may also include input/output devices (e.g., a keyboard/mouse and screen display for user interactions) and/or a network interface (e.g., for connecting to the Internet).

The computing system 100 operates on a candidate set 102 of machine-learning configurations and a dataset 104 on which the candidate configurations are to be trained and tested, and it returns an approximate best configuration 106 as output. The dataset 104 may be divided (e.g., randomly) into a training dataset 107 used to train the candidate configurations, and a test dataset 108 used to validate, that is, test the performance of, the trained configurations. The candidate set 102 of machine-learning configurations and the dataset 104 may be stored (e.g., in one or more databases) on one or more machine-readable media that are part of the computer(s) implementing computing system 100 or accessible by the computing system 100 via a network. For instance, in one non-limiting embodiment, the computing system 100 and the candidate set 102 may be provided on a server computer or group of server computers accessible by client computers via the Internet. The dataset 104 for a particular machine-learning task may be stored on a client computer and remotely accessed by the server computer(s) of computing system 100 or, alternatively, uploaded to the server computer(s). Upon determination of the approximate best configuration 106, an identifier of this configuration 106, including the data transformation operations, the name of a machine-learning model, and associated parameter values, may be communicated to the client computer, e.g., via a web-based user interface or message, and/or stored within the computing system 100 for later use by the client computer. Computer code and data structures implementing the selected configuration may also be downloadable to the client device.

The system 100 may further take performance and/or time constraints 110 as input (e.g., provided by a client computer) that quantify the degree to which the returned configuration 106 approximates the true best configuration and/or specify a time limit at which the iterative configuration-selection process is terminated. Performance criteria may, for instance, include an accuracy-loss tolerance and an associated minimum probability (usually taken to be a value close to 1, e.g., a value of at least 95% or even 99%) that the accuracy of the last remaining configuration in the candidate set 102, which is returned as the approximate best configuration 106, differs from the accuracy of the true best configuration by no more than the specified accuracy-loss tolerance. Loss tolerances for other quality metrics that may be used alternatively or in addition to the accuracy-loss tolerance include loss tolerances for, e.g., mean squared loss, normalized discounted cumulative gain, and Area Under the Curve (AUC). In embodiments in which a time constraint is imposed, the pruned candidate set may, at the time of termination, still include multiple candidate configurations. As the performance of these configurations (e.g., as measured in terms of the confidence bounds for their accuracy) is generally higher and more closely clustered (i.e., characterized by a narrower distribution with higher average) than the performance of the initial candidate set, any one of the remaining candidate configurations may serve as an approximate best configuration. Alternatively, a final selection step may identify, among the remaining configurations within the set at termination time, the one having the highest performance (e.g., highest lower confidence bound).

Each machine-learning configuration within the set 102 may specify a mathematical model (e.g., an equation or algorithm) for predicting output data from input data, in conjunction with a learning algorithm for setting adjustable parameters of the model to fit the training dataset 107. The model and/or learning algorithm may further include hyperparameters that are fixed for a given configuration, but can differ between potentially multiple configurations for a model and learning algorithm of a given type. In addition, each machine-learning configuration may specify how the "raw" input data (which may include, e.g., numbers, text, images, or audio data) is pre-processed and/or featurized to generate numerical input (e.g., input vectors) upon which the model can operate. Accordingly, different configurations within the set 102 generally differ in one or more of the types of predictive mode, the learning algorithm, the hyperparameters associated with the model or learning algorithm, and the computation and selection of input features.

The machine-learning configurations forming the candidate set 102, including the kinds of models and algorithms contained therein, generally depend on the particular machine-learning task and type of data they pertain to. For a task involving the prediction of a dependent quantitative variable from an independent quantitative variable, for instance, the candidate set 102 may include a decision tree and/or one or more regression models specifying candidate functional relationships between the variables. As another example, for a classification task, the models within the candidate set 102 may include, without limitation, a naïve Bayes classifier, a decision tree or random forest, a logistic regression model, and/or one or more artificial neural networks (with possibly various network architectures). Machine-learning configurations for neural-network models, in turn, may specify various associated learning algorithms (e.g., backpropagation of errors, or reinforcement learning with various rewards), and differ in hyperparameters such as the number of layers within a network, or the step size used when adjusting network weights in the learning process.

In various embodiments, the system 100 is used to select a machine-learning configuration for a supervised learning task. In supervised learning, the dataset 104 consists of pairs of input and output items, providing a straightforward way to measure the performance of a trained machine-learning configuration. In a classification task, for example, the output items are labels each specifying the class to which the respective input item belongs. A suitable quality metric for a trained classifier model is its classification accuracy, e.g., measured as the fraction of input items that are classified correctly (i.e., consistently with the output label). A classifier model may be trained to maximize the classification accuracy on the training dataset 107, and its performance can then be evaluated in terms of the classification accuracy it achieves on the test dataset 108. In the context of predicting dependent variables from independent variables, the output items are the actual values of the dependent variables for given independent-variable inputs. The prediction accuracy of a trained model can, in this case, be determined as a function of the discrepancy between actual and predicted output values (e.g., as measured by the sum of squared errors).

In various example embodiments described herein, the accuracy of a trained machine-learning configuration is used as the quality metric to quantify its performance. It is to be understood, however, that alternative quality metrics (e.g., mean squared loss, discounted cumulative gain, or AUC) can likewise be used. Furthermore, the determination of approximate best configurations in accordance with progressive sampling and pruning is not limited to configurations for supervised learning tasks, but can similarly be applied in the context of unsupervised learning or reinforcement learning, with suitable quality metrics known to those of ordinary skill in the art being available to measure the performance of the configurations and compute associated confidence intervals. For unsupervised learning tasks, for instance, mutual information and average distance are suitable quality metrics. In reinforcement learning, mean regret may be used as the quality metric.

With renewed reference to FIG. 1, the computing system 100 may include multiple processing components to select an approximate best configuration 106 from the candidate set 102; these components may include a training and test component 112, a data sampler 114, and a scheduling and pruning component 116. The individual components 112, 114, 116 may be implemented, for example, as separate software programs or modules executed by shared hardware processors. Alternatively, different ones of the components 112, 114, 116, or even different sub-components thereof, may be implemented by separate hardware components. For example, while the scheduling and pruning component 116 may be implemented in software executed by a CPU, the training and test component 112 may perform some learning algorithms of the candidate set 102 using FPGAs, and others using GPUs or CPUs. Further, the sampler 114, while functionally belonging to the computing system 100, may, in some embodiments, be executed on a separate computer holding the dataset 104.

The training and test component 112 is configured to train a selected candidate configuration on a sampled training dataset 118, which generally involves executing the learning algorithm of the selected configuration to adjust the parameters of the associated model. The training and test component 112 is further configured to evaluate the performance of the trained configuration on both the sampled training dataset 118 and a sampled test dataset 119 to compute associated training and test accuracies (or other quality metrics) 120. The data sampler 114 is configured to generate the sampled training and test datasets 118, 119 by sampling (e.g., randomly) from the full training and test datasets 107, 108, respectively, using sample sizes 122 determined by the scheduling and pruning component 116 and communicated to the data sampler 114, e.g., via the training and test component 112. The data sampler 114 as well as the training and test component 112 can be readily implemented by those of ordinary skill in the art without undue experimentation. Existing, publicly available software tools implementing the training and test component 112, or portions thereof, are, for instance, included in the open-source machine-learning toolkits "TLC" (by Microsoft Corporation, Redmond, WA) and "scikit-learn."

The scheduling and pruning component 116 is configured to control the iterative process of sampling, training and testing machine-learning configurations selected from the candidate set 102, and pruning the candidate set 102. Based on the training and test accuracies 120 computed by the training and test component 112, the scheduling and pruning component 116 computes and updates confidence intervals associated with a trained and tested configuration, and then prunes the candidate set 102 based thereon in conjunction with the performance and time constraints 110. For example, in some embodiments, the scheduling and pruning component 116 removes from the candidate set 102 any configuration whose upper confidence bound exceeds the highest lower confidence bound (among all configurations) by no more than the accuracy-loss tolerance. The scheduling and pruning component 116 further selects, in each iteration, the configuration 124 to be trained and tested next, and determines the associated sample size 122. The selected configuration 124 and sample size 122 may be communicated to the training and test component 112. The various functions of the scheduling and pruning component will be described in more detail further below with reference to FIGS. 3A-5.

Figure 2:
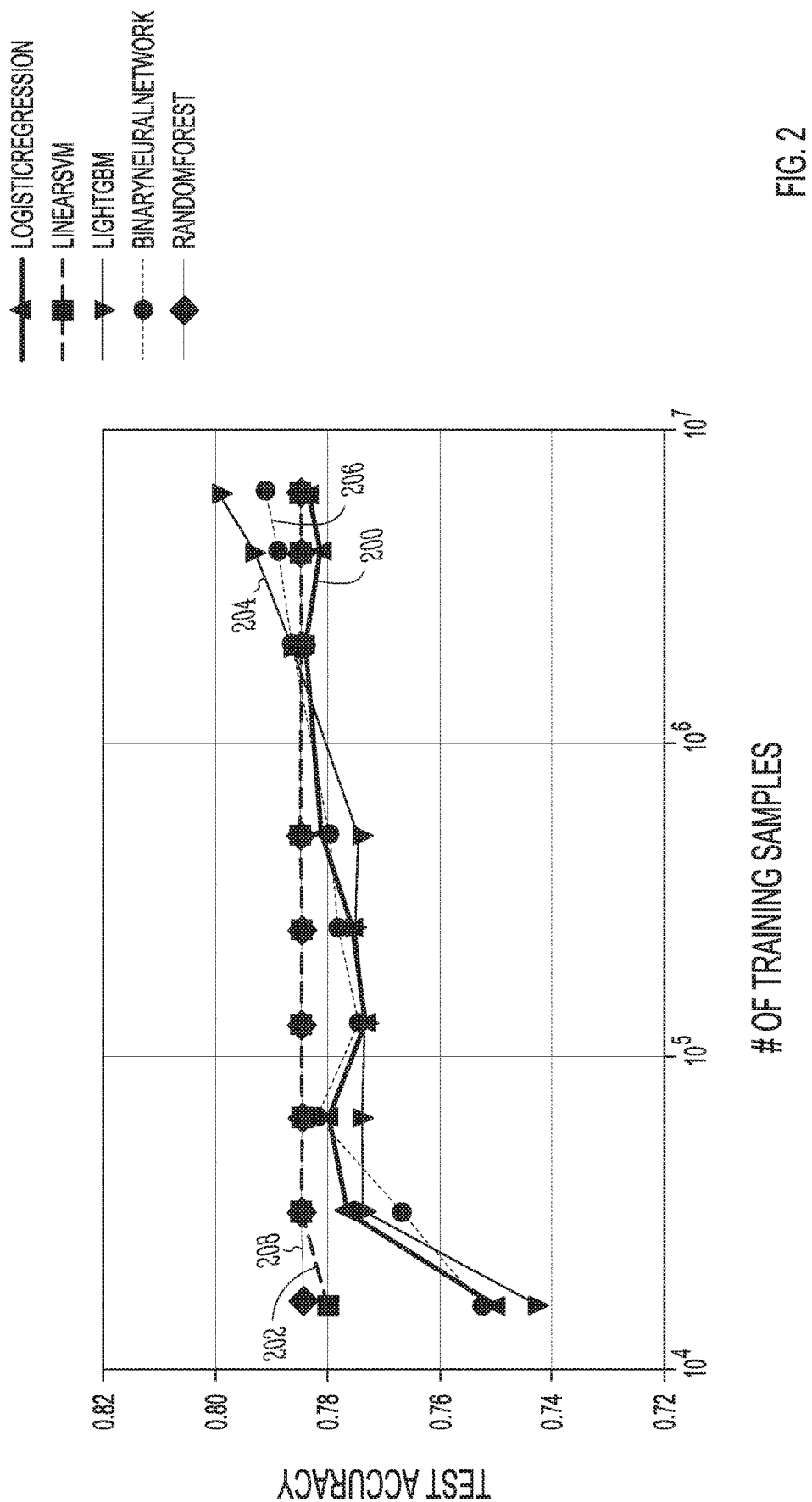
FIG. 2 is a graph showing learning curves for multiple example machine learning algorithms trained on an example dataset.

Turning now to FIG. 2, some observations and insights on progressive sampling are illustrated with a graph that shows empirical learning curves 200, 202, 204, 206, 208 for five example machine-learning configurations trained on an example dataset of flight delay data. Each learning curve plots the test accuracy of the respective configuration (determined on a constant (full) test dataset) as a function of the sample size of the sampled training dataset on a log-scale. For a large enough sample size (greater than about two million), the configuration with the highest test accuracy is "LightGBM" (curve 204). As can further be seen, the "optimal" sample size to minimize the runtime for training a configuration, that is, the minimum sample size beyond which the test accuracy does not significantly increase, varies between configurations, being about 16,000 (as compared with two million) for all other depicted configurations (curves 200, 202, 206, 208). Thus, if the optimal sample size was known a priori, these other configurations could be tested with only 16,000 samples, further reducing overall training time. In general, however, the optimal sample size is not known at the outset. Moreover, even the seemingly natural approach to gradually increase, in an iterative training and testing process, the sample size until a plateau is reached in the learning curve, and then use that sample size as an estimate of the optimal sample size, is error-prone. The learning curve 204 for LightGBM, for example, is relatively flat between 32,000 and 128,000 samples, but increases substantially in test accuracy beyond 128,000 samples.

Disclosed herein is a more robust strategy that involves estimating a confidence interval for the real test accuracy of a configuration rather than using a point estimate such as the "plateau estimate." As the sample size increases during repeated training of a given configuration, the confidence interval shrinks, allowing poorly performing configurations to be pruned.

Figure 3A:
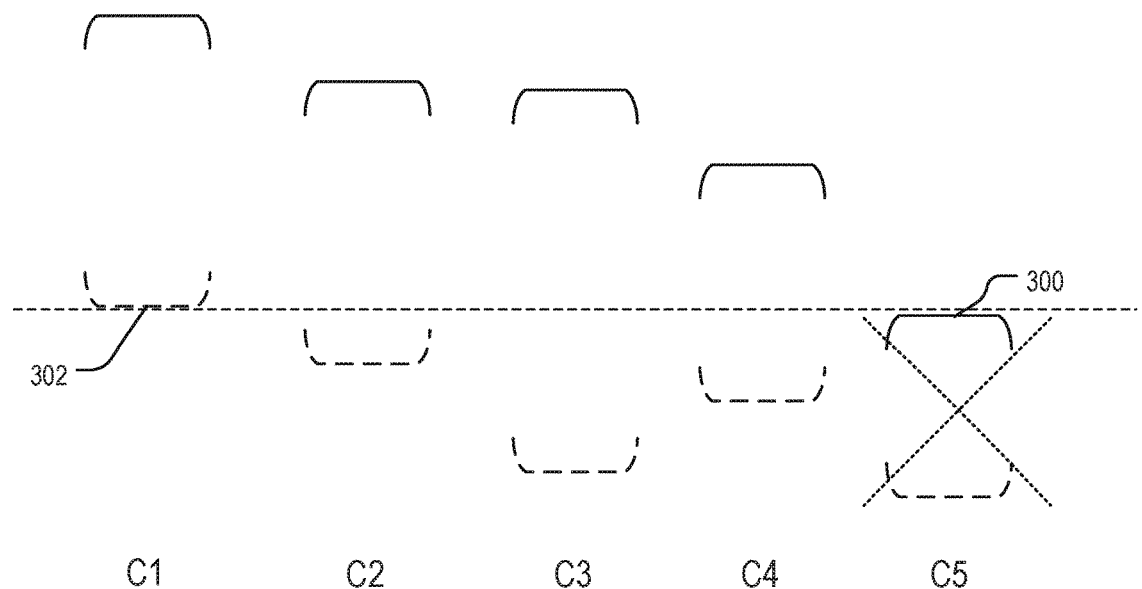
FIGS. 3A-3C show a sequence of estimated confidence intervals for a candidate set of machine-learning configurations, illustrating progressive pruning in accordance with various embodiments.
Figure 3B:
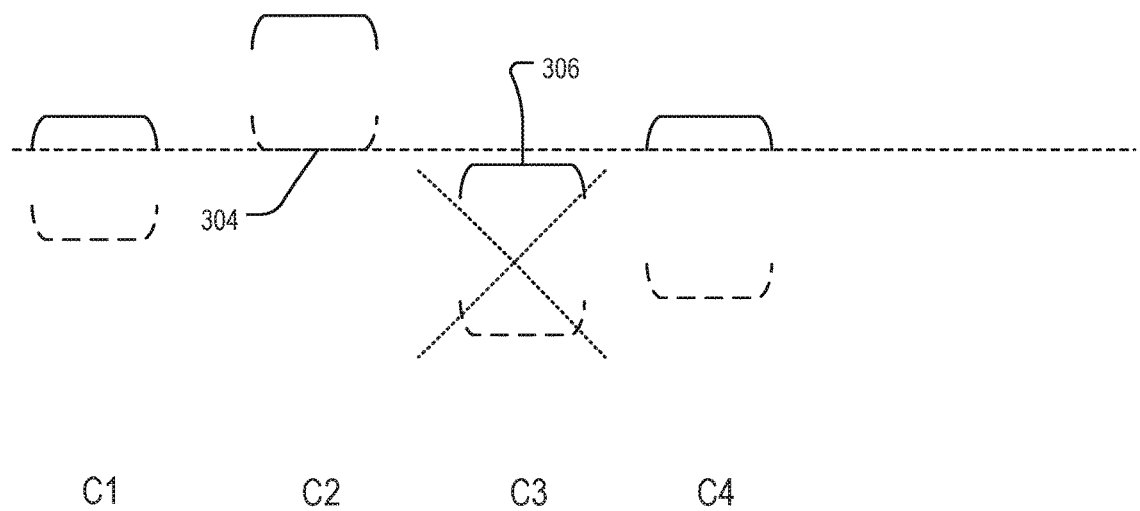
Figure 3C:
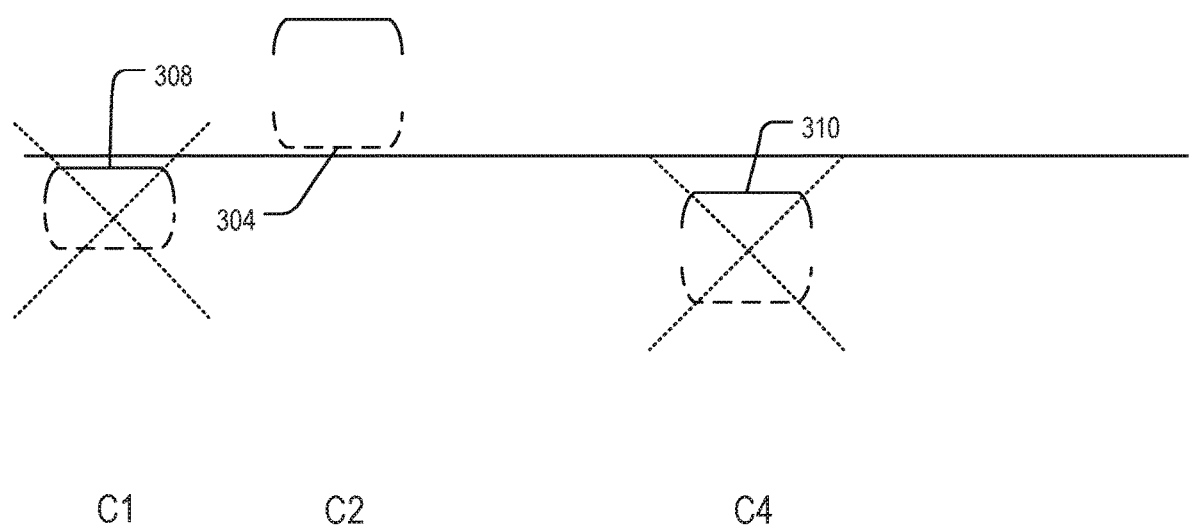

FIGS. 3A-3C illustrate the progressive, confidence-interval-based pruning according to various embodiments with an example sequence of estimated confidence intervals for an example candidate set of initially five machine-learning configurations, labeled C1 through C5. For ease of illustration, pruning in the depicted example is performed with an accuracy-loss tolerance of zero, meaning that a configuration is deleted from the set only when its upper bound is at or falls below the lower bound of the highest-confidence interval among all the configurations (such that there is no longer a range of overlap between the two configurations). More generally, however, the accuracy-loss tolerance need not be zero, but may also be set to a small positive value that allows pruning even of configurations that have some overlap (up to the non-zero accuracy-loss tolerance) with the highest-confidence configuration.

FIG. 3A shows the upper and lower confidence bounds for all five configurations at a time within the iterative training and testing process when all configurations have been trained and tested on respective sampled datasets. The best-performing configuration at this time is configuration C1. As can be seen, the upper bound 300 of the confidence interval for configuration C5 is below the lower bound 302 of the confidence interval for configuration C1. Thus, configuration C5 can be removed from the candidate set. FIG. 3B shows the remaining candidate set a few iterations later with updated confidence intervals. Now, configuration C2 has surpassed the performance of configuration C1 and has the highest associated lower bound 304, and configuration C3 has fallen below that lower bound 304 with its upper bound 306. Accordingly, configuration C3 is removed at this stage. Still a few iterations later, as shown in FIG. 3C, the upper bounds 308, 310 for configurations C1 and C4 are below the updated lower bound 304 of configuration C2. Thus, configurations C1 and C4 can be pruned, leaving only configuration C2 as the approximate best configuration in the candidate set.

Figure 4:
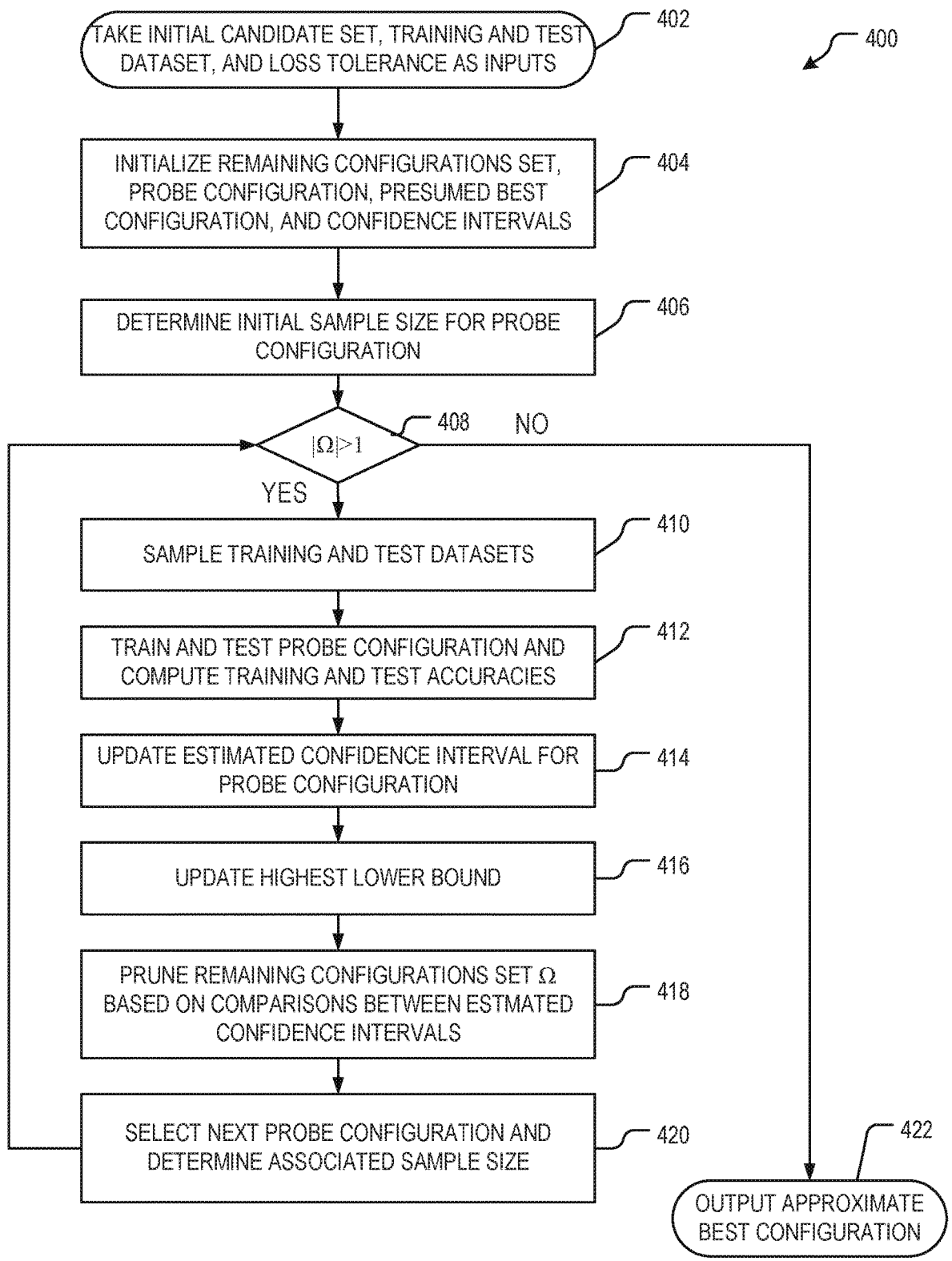
FIG. 4 is a flow chart illustrating a method for the efficient automated determination of an approximate best machine-learning configuration, in accordance with various embodiments.

With reference to FIG. 4, a method 400 for the efficient automated determination of an approximate best machine-learning configuration, in accordance with various example embodiments, will now be described in more detail. The method 400 takes, at 402, an initial set C of $|C|=n$ candidate configurations (corresponding to set 102), training and test datasets (107, 108), and a prescribed loss tolerance (e.g., accuracy-loss tolerance) $\epsilon$ as inputs. The method 400 involves an iterative process of training and testing (herein also "probing") a selected candidate configuration (herein also the "probe configuration") and pruning the candidate set of remaining configurations, $\Omega$, based on these probes. At 404, the remaining configurations set $\Omega$ is initialized to C, the probe configuration $C_{prob}$ is initialized to a candidate configuration $C_1$ selected (e.g., randomly) from C, and a presumed best configuration $C_{i'}$ is initialized to the same candidate configuration $C_1$. Further, estimated confidence intervals for all configurations within the set C may be initialized, e.g., to the full possible range that the selected quality metric can assume (e.g., to a range from 0 to 1 for confidence intervals based on accuracy). At 406, an initial training sample size for configuration $C_1$ is determined, e.g., based on a predetermined sampling schedule associated with the configuration. An initial test sample size may also be determined at 406 in accordance with a sampling schedule for $C_1$. Following these initialization operations, the method 400 proceeds into a loop in which selected configurations are iteratively trained and tested, and the set $\Omega$ is iteratively pruned, as long as the number of remaining configurations in the set $\Omega$ is greater than 1 (as determined at 408).

In each loop of the iterative process, the training and test datasets are sampled (e.g., by data sampler 114), at 410, based on the determined sample sizes. At 412, the probe configuration $C_{prob}$ is trained on the sampled training dataset, and then evaluated on the sampled test dataset (or, in some embodiments, on the full test dataset) (e.g., by training and test component 112). In the course of training and testing, a quality metric characterizing the performance of the trained probe configuration $C_{prob}$ is evaluated on the sampled training and test datasets. For example, if predictive accuracy is used as the quality metric, training and test accuracies are computed. At 414, the estimated confidence interval associated with the probe configuration $C_{prob}$ is updated (e.g., by scheduling and pruning component 116) based on the training and test accuracies (or training and test values of some other quality metric), optionally in conjunction with other parameters. The confidence interval provides estimated bounds for the real performance of the probe configuration $C_{prob}$, that is, the accuracy (or other quality metric) the configuration would achieve if trained on the full training dataset 107 and tested on the full test dataset 108. The lower bound of the estimated confidence interval is generally lower than the test accuracy (or test value of another quality metric), and the higher bound of the estimated confidence interval is generally higher than the training accuracy (or training value of the other quality metric).

At 416, the updated lower bound $C_{prob}.l$ is compared against the lower bound $C_{i'}.l$ of the current presumed best configuration $C_{i'}$, and if $C_{prob}.l > C_{i'}.l$ the presumed best configuration $C_{i'}$ is updated to the probe configuration $C_{prob}$ (and the lower bound $C_{i'}.l$ is, accordingly, updated to $C_{prob}.l$). The remaining configurations set $\Omega$ is then pruned, at 418, based on comparisons between the lower bound $C_{i'}.l$ of the new presumed best configuration (which, by virtue of the iterative updating of the presumed best configuration, is the configuration with the highest lower bound) and the upper bounds C.u of the other configurations C within the set $\Omega$: any configuration C whose upper bound exceeds the highest lower bound by no more than the loss tolerance $\epsilon$, C. $\mathcal{U} - C_i.l \leq \epsilon$, is removed from the set $\Omega$. (As will be appreciated by those of ordinary skill in the art, it is also possible to retain, in alternative embodiments, configurations with C. $\mathcal{U} - C_i.l = \epsilon$ within the set $\Omega$, and prune only configurations whose upper bound exceeds the highest lower bound by less than the loss tolerance $\epsilon$, i.e., C. $\mathcal{U} - C_i.l < \epsilon$. Whether configurations with upper bound C. $\mathcal{U} = C_i.l + \epsilon$ are retained or pruned is practically unimportant, that is, the two embodiments are equivalent for practical purposes.)

Following pruning (at 418), a configuration for the next probe is selected from the remaining configurations set $\Omega$, and the associated sample sizes for sampling the training and test datasets are determined (e.g., by scheduling and pruning component 116) at 420. The configuration selection may be based on the confidence intervals associated with the configurations and/or the training time required to narrow the confidence interval by training with increased sample size; one example embodiment is detailed below with reference to FIG. 5. The iterative process of training and testing the selected configuration on sampled datasets, updating the confidence interval, pruning the candidate set $\Omega$ of remaining configurations, and selecting a new probe configuration (operations 410-420) may continue as long as more than one candidate configuration remain in the set $\Omega$. Once only one configuration is left within the set $\Omega$, that configuration is returned as the approximate best configuration (at 422). Alternatively, in some embodiments (not illustrated in FIG. 4), the iterative process may terminate when a specified time limit has been reached; and among the configurations then still remaining within the set $\Omega$, one may be selected (e.g., based on a highest associated upper or lower bound) and returned as the approximate best configuration.

In order for the method 400 to efficiently identify, among the candidate configurations, a configuration that, with high probability, performs optimally or at least near-optimally (as hereinafter evaluated in terms of the accuracy of the trained model), the confidence intervals may be computed in a manner that meets two criteria: that the confidence interval for a given trained configuration contains the real test accuracy of that configuration with high probability, and that the computation of the upper and lower confidence bounds is no slower than the training of the configuration. In various embodiments, these criteria are met with upper and lower bounds computed based on the training and test accuracies of a trained configuration in conjunction with the sizes (i.e., numbers of samples) of the sampled training dataset, the sampled test dataset, and the full test dataset, as well as the number of configurations in the initial candidate set, and the probability that the approximate best configuration returned by the method 400 has an accuracy within the loss tolerance c of the accuracy of the best configuration.

For the purpose of more specifically relating the confidence interval [l,u] associated with a given probe of a respective configuration $C \in \mathcal{C}$ to the real performance of the configuration, let $D_{tr}$ and $D_{te}$ denote the training dataset 107 and test dataset 108, respectively, and let $S_{tr}$ and $S_{te}$ denote the sampled training dataset 118 and the sampled test dataset 119 for a given probe, respectively. The respective numbers of samples are indicated by $|D_{tr}|$, $|D_{te}|$, $|S_{tr}|$, and $|S_{te}|$. Further, let $H_{tr}$ denote the machine-learning model (e.g., classifier) output by the learning algorithm under the configuration C upon training on the full training dataset $D_{tr}$ (herein also referred to as the "configuration C as trained on the dataset $D_{tr}$"), and let $H_{S_{tr}}$ similarly denote the configuration C as trained on a sampled training dataset $S_{tr}$. Further, let $\mathcal{A}(H_{S_{tr}}, S_{tr})$ and $\mathcal{A}(H_{S_{tr}}, S_{tr})$ denote the training and test accuracies of the configuration C as trained on the sampled training dataset $S_{tr}$, and let $\mathcal{A}(H_{tr}, \mathcal{D}_{te})$ denote the real test accuracy of the configuration C if trained on the full training dataset $D_{tr}$.

Under the assumption that the test accuracy in a dataset D of a configuration trained on D is no worse than the test accuracy in D of the same configuration trained on a different dataset D' (which reflects the fact that the training process generally produces a trained model that fits the training data), it can be shown that, with a probability of at least $$1 - \frac{\delta}{2n^2},$$

(where n is the number of configurations in the initial set $\mathcal{C}$):

$$\mathcal{A}(H_{tr}, \mathcal{D}_{te}) \leq u \triangleq \mathcal{A}(H_{S_{tr}}, S_{tr}) + \left(\frac{1}{2|S_{tr}|}\ln\frac{4n^2}{\delta}\right)^{\frac{1}{2}} + \left(\frac{1}{2|D_{te}|}\ln\frac{4n^2}{\delta}\right)^{\frac{1}{2}}.$$

The upper confidence bound it, thus computed, has an additive form with three components: the training accuracy on the sampled training dataset $S_{tr}$, a variation term due to training sample size $|S_{tr}|$, and a variation term due to full testing data size $|D_{te}|$. Intuitively, u increases as the training accuracy $\mathcal{A}(H_{S_{tr}}, S_{tr})$ increases because higher training accuracy indicates higher potential of the learning ability of the configuration. That potential, however, decreases as the training sample size $|S_{tr}|$ increases because the more data has been used in training, the less room for improvement by adding more training data remains. Finally, since the real test accuracy is measured in the full test dataset $D_{te}$, the variation due to the random split of the dataset into training and test datasets is added. The larger $D_{te}$, the smaller is that variation. Both variation terms are affected by the confidence probability $$1 - \frac{\delta}{2n^2}.$$

Higher confidence probability corresponds to a wider confidence interval and, thus, a larger value of u. In sum, the upper confidence bound u, computed according to the above formula, correlates positively with the training accuracy and the number of configurations n, and negatively with the sizes of the training dataset and the full test dataset. It is noted that the computation of the training accuracy $\mathcal{A}(H_{S_{tr}}, S_{tr})$ (which is the most time-consuming step in the computation of u and the only step that varies in computation time based on the sample size $S_{tr}$) is no slower than the training of the configuration on the sampled dataset. In fact, testing is usually much more efficient than training for a dataset of the same scale.

Turning now to the lower confidence bound, since training on the full dataset produces better accuracy than training on a sampled training dataset, the real test accuracy of the trained configuration, $\mathcal{A}(H_{tr}, \mathcal{D}_{te})$, can be lower-bounded by the test accuracy of the configuration trained on the sampled training dataset, $\mathcal{A}(H_{S_{tr}}, D_{te})$. However, the testing of a trained configuration on the full test dataset to compute $\mathcal{A}(H_{S_{tr}}, D_{te})$ can be slower than training on the sampled training dataset if $|D_{te}| \gg |S_{tr}|$. To render the computation of the confidence interval computation, the test data is therefore also sampled, in accordance with various embodiment, and the test accuracy on the full test dataset is lower-bounded by the test accuracy on the sampled test dataset minus some variation term. It can be shown that, with a probability of at least $$1 - \frac{\delta}{2n^2}:$$

$$\mathcal{A}(H_{tr}, \mathcal{D}_{te}) \geq l \triangleq \mathcal{A}(H_{S_{tr}}, S_{te}) - \left(\frac{1}{2|S_{te}|}\ln\frac{4n^2}{\delta}\right)^{\frac{1}{2}}.$$

The lower confidence bound l, thus computed, is the accuracy of $H_{S_{tr}}$ in the sampled test dataset $S_{te}$, minus a variation term due to the size of the sample: size $|S_{te}|$ of the sampled test dataset. As the sample size $|S_{te}|$ increases, the difference between $\mathcal{A}(H_{S_{tr}}, S_{te})$ and $\mathcal{A}(H_{S_{tr}}, D_{te})$ becomes smaller, and the lower bound rises. Higher confidence probability $$1 - \frac{\delta}{2n^2}$$

corresponds to smaller l. In sum, l is positively correlated with the size of the sampled test dataset and the test accuracy in that sample, and negatively correlated with n.

From the two above inequality relations, it follows that, with a probability of at least $$1 - \frac{\delta}{n^2},$$

the true accuracy $\mathcal{A}(H_{tr}, \mathcal{D}_{te})$ of a trained configuration is within the confidence interval [l, $\mathcal{U}$] with the above expressions for the lower and upper bounds of the confidence interval. It can further be shown that, with a probability of at least 1−δ, the method 400 of FIG. 4, using these expressions for l and u, returns, as the approximate best configuration $C_{i'}$, a configuration whose real test accuracy $\mathcal{A}_{i'}$ is within the accuracy-loss tolerance ϵ of the test accuracy $\mathcal{A}_i^*$ of the true best configuration $C_i^*$: $\mathcal{A}_i^* - \mathcal{A}_i \leq \epsilon$.

Accordingly, in various embodiments, an accuracy-loss tolerance ϵ and a (small) maximum tolerable probability δ that the identified approximate best configuration deviates by more than ϵ from the accuracy of the best configuration are specified as inputs to the configuration-selection method, and the approximate best configuration is then determined based on confidence intervals computed with the above-referenced formulas by progressively pruning configurations whose associated confidence intervals overlap by no more than ϵ with the confidence interval currently having the highest lower bound. In accordance with some embodiments, the loss tolerance ϵ may be set to zero, such that the identified approximate best configuration is the true best configuration (or one of multiple configurations with equal best performance.)

Note that the method 400 need not necessarily employ the above specific expressions for the upper and lower bounds. The confidence intervals may, instead, be estimated using alternative formulas, but the above probabilistic guarantees for finding a configuration within the specified loss tolerance may not apply in other cases. Nonetheless, a pruning process employing different estimates for the confidence bounds may provide an efficient way of determining a likely at least near-optimal configuration or reduced candidate set of such configurations. Subsequent training and testing may be employed to further evaluate the performance of such configuration(s).

Figure 5:
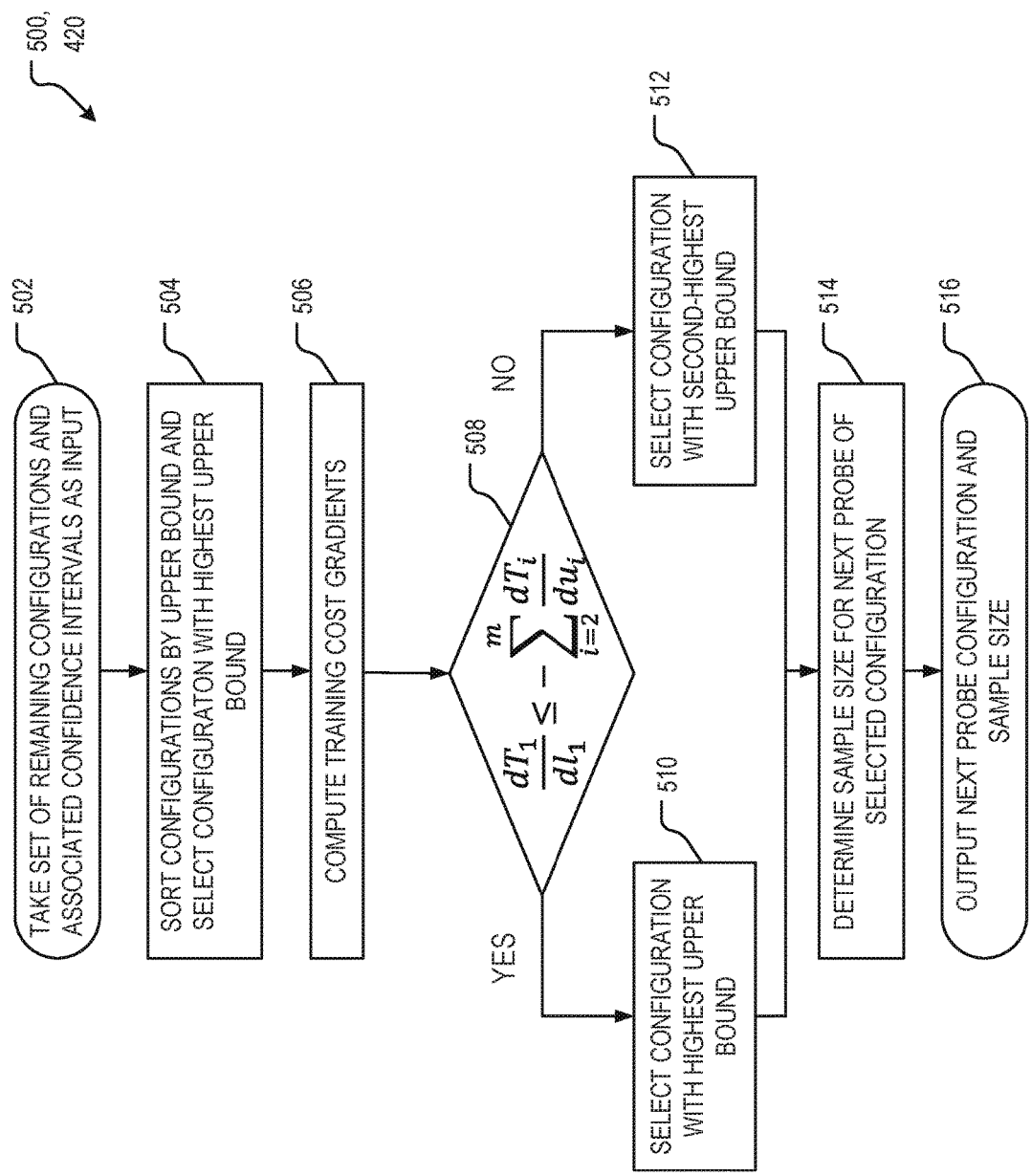
FIG. 5 is a flow chart illustrating the selection of a new machine-learning configuration, within the iterative method of FIG. 4, in accordance with various embodiments.

Turning now to the selection of probe configurations and associated sample sizes (at 420 of the iterative method 400), FIG. 5 illustrated an example method 500 for selecting the next probe configuration based on training cost gradients that measure the increase in training time to achieve narrower confidence intervals. To motivate the depicted approach, consider the total runtime $\mathcal{T}$ for identifying and training the approximate best configuration. Let $T_i(s)$ denote the probing time for configuration $C_i$ on a sampled training dataset of size s, and let $t_i$ be the accumulated runtime for probing configuration $C_i$ in method 400. Further, let $l_i$ and $u_i$ be the lower and upper bounds of the confidence interval for $C_i$ at the time the iterative algorithm terminates. Without loss of generality, assume that method 400 returns $C_1$ as the best approximate configuration. With these notations, the total runtime can be expressed as:

$$\mathcal{T} = \Sigma_i t_i + T_1(|D_{tr}|).$$

In accordance with various embodiments, the scheduling of probe configurations (i.e., the selection of the configuration for the next probe in each configuration) is designed with a view towards minimizing $\mathcal{T}$, subject to the constraint:

$$\mathcal{U}_2 \le l_1 + \epsilon, \mathcal{U}_3 \le l_1 + \epsilon, \ldots, \mathcal{U}_n \le l_1 + \epsilon,$$

which ensures that all configurations except $C_1$ are pruned. In the above expression for $\mathcal{T}$, the first term corresponds to the time it takes to identify the approximate best configuration; since the runtime in each iteration is generally dominated by the training, the total time of all probes is used as a proxy for this identification time. The second term is the time taken to train the approximate best configuration, once identified, on the full training dataset; this term is constant.

To minimize $\mathcal{T}$, begin by studying the "oracle" optimal scheduling scheme when it has access to the accumulated runtime $t_i$ for $C_i$ as a function of the upper and lower bounds of the respective confidence interval at the time of termination, i.e., $t_i = f_i(l_i) = g_i(\mathcal{U}_i)$. With this oracle access, the optimal scheme would probe each configuration only once (since, otherwise, the total runtime could be reduced by only keeping the last probe). Ignoring the constant term, the total runtime $\mathcal{T}$ can be rewritten as $f_1(l_1) + g_2(\mathcal{U}_2) + \ldots + g_n(\mathcal{U}_n)$. Using the method of Lagrange multipliers, it can be shown that the optimal solution would satisfy:

$$\frac{df_1}{dl_1} = -\left(\frac{dg_2}{du_2} + \ldots + \frac{dg_n}{du_n}\right)$$

with $l_1 + \epsilon = u_2 = \ldots = u_n$.

In practice, there is no oracle access to $f_i(l_i)$ and $g_i(\mathcal{U}_i)$, and no closed-form formula to determine the optimal sample size $S_i^*$ for configuration $C_i$. Therefore, configurations are, in accordance herewith, iteratively trained on datasets of progressively increasing sample size. In some embodiments, the associated scheduling scheme is informed by the above oracle-based solution, and uses training cost gradients that approximate the derivatives of $f_i$ and $g_i$ with respect to the confidence interval bounds.

With reference to FIG. 5, in accordance with various example embodiments, the selection (at 420 within method 400) of a configuration for the next probe in the iterative process takes the current set Ω of m remaining configurations and their associated confidence intervals as input at 502. The configurations are sorted by their respective upper bounds (in descending order), and the configuration with the highest upper bound (herein, without loss of generality, assumed to be $C_1$) is selected as an initial guess for the best configuration (at 504). Further, at 506, training cost gradients $$\frac{\Delta T_i}{\Delta l_i} \text{ (for } i = 1\text{) and } \frac{\Delta T_i}{\Delta u_i} \text{ (for } i = 2, \ldots, m\text{)}$$

are computed for the m configurations rerrraining in Ω based on the runtime difference $\Delta T_i$ between the two most recent consecutive probes of the respective configuration $C_i$ and the associated difference $\Delta l_i$ and $\Delta \mathcal{U}_i$ in the lower and upper confidence bounds. At 508, the training cost gradient $$\frac{\Delta T_1}{\Delta l_1}$$

for the configuration with the highest upper bound is compared against the sum of training cost gradients of all other configurations. If $$\frac{\Delta T_1}{\Delta l_1} \le \left|\sum_{i=2}^{m} \frac{\Delta T_i}{\Delta u_i}\right|,$$

configuration $C_1$ s selected for the next probe (at 510); otherwise, the configuration with the second-highest upper bound is selected for the next probe (at 512). Intuitively, if the lower bound of $C_1$ grows faster (per training time spent) than the upper bounds of all other configurations combined decrease, it is beneficial to probe $C_1$ next. Otherwise, the configuration with the second-highest bound is chosen (among $C_2$ through $C_m$), which goes towards attaining the same upper bound for all configurations (as suggested by the second condition for the oracle-based solution). Once the configuration for the next probe has been selected, the associated sample size for the next probe is determined (at 514), e.g., based on a sampling schedule associated with the selected configuration. The selected configuration and associated sample size are then output (at 516) back into the iterative method 400.

In accordance with various embodiments, sample schedules associated with the configurations are predetermined, such that the sample size(s) for the next probe (i.e., the size of the sampled training dataset and, if the test dataset is likewise sampled, the sample size of the sampled test dataset) can simply be looked up during the iterative process. The sample schedules may be geometric, meaning that, between any two consecutive probes of the same configuration, the sample size (for training or testing) increases by a constant factor c. The optimal value of c is generally dependent on certain aspects of the configuration e.g., the model and/or learning algorithm). It can be shown that, when the probing time $T_i(s)$ for configuration $C_i$ is a power function of the training sample size s, i.e., $T_i(s)=s^\alpha$ (where $\alpha$ is a real number), the optimal step size follows.

$$c = 2^{\frac{1}{\alpha}}.$$

For example, if the time to probe a configuration is proportional to the sample size (i.e., $\alpha=1$), the sample size may be doubled for each successive probe of that configuration. A progressive test sample schedule can be similarly determined based on the functional dependence of the test time on the size of the sampled test dataset.

Beneficially, the method 400, in particular when used in conjunction with the scheduling method 500 of FIG. 5 and geometric sampling, can significantly reduce the runtime for determining an approximate best configuration. In some embodiments, as experiments on multiple datasets have shown, approximate best configurations with accuracies within 1% from that of the true best configuration can be obtained several tens of times faster than an algorithm to determine the best configuration by training and testing each configuration on the full training and test datasets, respectively. Further, under conditions where the (unknown) functions $f_i(l_t)$ and $g_i(u_t)$ can be assumed to be convex, a 4-approximate guarantee for the method 500 with respect to the oracle optimal runtime when $\epsilon=0$ (meaning that the runtime of method 500 is no more than four times the optimal runtime) can be theoretically proven. As the loss tolerance $\epsilon$ is increased, the runtime tends to decrease substantially.

The method 400 need, of course, not employ the exact scheduling method 500 and/or geometric sampling. Other approaches to selecting configurations and associated sample sizes, as well as alternative ways of computing confidence intervals, may occur to those of ordinary skill in the art, and may retain some or all of the benefits of the specific embodiments described herein.

In general, the operations, algorithms, and methods described herein may be implemented in any suitable combination of software, hardware, and/or firmware, and the provided functionality may be grouped into a number of components, modules, or mechanisms. Modules and components can constitute either software components (e.g., code embodied on a non-transitory machine-readable medium) or hardware-implemented components. A hardware-implemented component is a tangible unit capable of performing certain operations and can be configured or arranged in a certain manner. In example embodiments, one or more computer systems a standalone, client, or server computer system) or one or more processors can be configured by software (e.g., an application or application portion) as a hardware-implemented component that operates to perform certain operations as described herein.

In various embodiments, a hardware-implemented component can be implemented mechanically or electronically. For example, a hardware-implemented component can comprise dedicated circuitry or logic that is permanently configured (e.g., as a special-purpose processor, such as a field programmable gate array (FPGA) or an application-specific integrated circuit (ASIC)) to perform certain operations. A hardware-implemented component can also comprise programmable logic or circuitry (e.g., as encompassed within a general-purpose processor or other programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) can be driven by cost and time considerations.

Accordingly, the term "hardware-implemented component" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a general-purpose processor configured using software, the general-purpose processor can be configured as respective different hardware-implemented components at different times. Software can accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components can be regarded as being communicatively coupled. Where multiple such hardware-implemented components exist contemporaneously, communications can be achieved through signal transmission (e.g., over appropriate circuits and buses that connect the hardware-implemented components). In embodiments in which multiple hardware-implemented components are configured or instantiated at different times, communications between such hardware-implemented components can be achieved, for example, through the storage and retrieval of information in memory structures to which the multiple hardware-implemented components have access. For example, one hardware-implemented component can perform an operation and store the output of that operation in a memory device to which it is communicatively coupled. A further hardware-implemented component can then, at a later time, access the memory device to retrieve and process the stored output. Hardware-implemented components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions. The components referred to herein can, in some example embodiments, comprise processor-implemented components.

Similarly, the methods described herein can be at least partially processor-implemented. For example, at least some of the operations of a method can be performed by one of processors or processor-implemented components. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS) For example, at least some of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a component, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

FIG. 6 is a block diagram of a machine in the example form of a computer system 600 within which instructions 624 may be executed to cause the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU), or both), a main memory 604, and a static memory 606, which communicate with each other via a bus 608. The computer system 600 can further include a video display 610 (e.g., a liquid crystal display (LCD) or a cathode ray tube (CRT)). The computer system 600 also includes an alpha-numeric input device 612 (e.g., a. keyboard or a touch-sensitive display screen), a user interface (UI) navigation (or cursor control) device 614 (e.g., a mouse), a disk drive unit 616, a signal generation device 618 (e.g., a speaker), and a network interface device 620.

The disk drive unit 616 includes a machine-readable medium 622 on which are stored one or more sets of data structures and instructions 624 (e.g., software) embodying or utilized by any one or more of the methodologies or functions described herein. The instructions 624 can also reside, completely or at least partially, within the main memory 604 and/or within the processor 602 during execution thereof by the computer system 600, with the main memory 604 and the processor 602 also constituting machine-readable media.

While the machine-readable medium 622 is shown in an example embodiment to be a single medium, the term "machine-readable medium" can include a single medium or multiple media (e.g., a centralized or distributed database, and/or associated caches and servers) that store the one or more instructions 624 or data structures. The term "machine-readable medium" shall also be taken to include any tangible medium that is capable of storing, encoding, or carrying instructions 624 for execution by the machine and that cause the machine to perform any one or more of the methodologies of the present disclosure, or that is capable of storing, encoding, or carrying data structures utilized by or associated with such instructions 624. The term "machine-readable medium" shall accordingly be taken to include, but not be limited to, solid-state memories, and optical and magnetic media. Specific examples of machine-readable media 622 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 624 can be transmitted or received over a communication network 626 using a transmission medium. The instructions 624 can be transmitted using the network interface device 620 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi and 4G/5G networks). The term "transmission medium" shall be taken to include any intangible medium that is capable of storing, encoding, or carrying instructions 624 for execution by the machine, and includes digital or analog communications signals or other intangible media to facilitate communication of such software.

The following numbered examples are provided as illustrative embodiments.

Example 1: One or more machine-readable media storing instructions for execution by one or more hardware processors, execution of the instructions causing the one or more hardware processors to determine an approximate best machine-learning configuration among a set of machine-learning configurations by performing operations comprising: selecting a machine-learning configuration within the set for training and determining an associated sample size; causing the selected machine-learning configuration to be trained on a sampled training dataset having the associated sample size; estimating a confidence interval of a quality metric for the trained machine-learning configuration; and pruning the set based on comparisons between the estimated confidence interval of the trained machine-learning configuration and estimated confidence intervals of other machine-learning configurations within the set.

Example 2: The one or more machine-readable media of example 1, wherein the selecting, causing, estimating, and pruning operations are performed iteratively.

Example 3: The one or more machine-readable media of example 2, wherein the approximate best machine-learning configuration is a last machine-learning configuration remaining within the set upon iterative pruning.

Example 4: The one or more machine-readable media of example 2 or example 3, wherein, for each of the machine-learning configurations, the associated sample sizes increase progressively over repeated training iterations.

Example 5: The one or more machine-readable media of example 4, wherein the associated sample sizes increase geometrically over repeated training iterations.

Example 6: The one or more machine-readable media of any one of examples 1-5, wherein the confidence interval is estimated based at least in part on a training value of the quality metric as determined for the trained machine-learning configuration on the sampled training dataset and a test value of the quality metric determined for the trained machine-learning configuration based on a sampled test dataset.

Example 7: The one or more machine-readable media of example 6, wherein an upper bound of the estimated confidence interval is greater than the training value and a lower bound of the confidence interval is smaller than the test value.

Example 8: The one or more machine-readable media of any one of examples 1-7, wherein the quality metric measures an accuracy of predictions made by the trained machine-learning configuration.

Example 9: The one or more machine-readable media of any one of examples 1-8, wherein pruning the set of machine-learning configurations comprises determining, among lower bounds of the confidence intervals of the machine-learning configurations within the set, a highest lower bound, and removing any machine-learning configuration from the set whose confidence interval has an upper bound that exceeds the highest lower bound by no more than a prescribed loss tolerance.

Example 10: The one or more machine-readable media of any one of examples 1-10, wherein selection of a machine-learning configuration for training is based at least in part on training costs associated with reducing the confidence intervals of the machine-learning configurations within the set.

Example 11: The one or more machine-readable media of any one of examples 1-10, wherein the approximate best machine-learning configuration is one of one or more machine-learning configurations remaining within the pruned set when a time limit has been reached.

Example 12: A method comprising: iteratively pruning a set of machine-learning configurations based on a training dataset and a test dataset by using one or more hardware processors to perform operations comprising, in each of a plurality of iterations: sampling the training and test datasets in accordance with a sampling schedule associated with a machine-learning configuration selected from the set; training the selected machine-learning configuration based on the sampled training dataset and determining a training accuracy associated with the trained selected machine-learning configuration; evaluating the trained selected machine-learning configuration based on the sampled test dataset to determine a test accuracy associated with the trained selected machine-learning configuration; determining a confidence interval associated with the trained selected machine-learning configuration based at least in part on the training and test accuracies; pruning the set of machine-learning configurations based on comparisons between the determined confidence interval and confidence intervals associated with other machine-learning configurations within the set; and selecting one of the machine-learning configurations remaining within the pruned set for a next iteration.

Example 13: The method of example 12, wherein pruning the set of machine-learning configurations comprises comparing, among the confidence intervals associated with the machine-learning configurations within the set, a confidence interval having a highest lower bound against all other confidence intervals, and removing from the set of machine-learning configurations any machine-learning configuration whose associated confidence interval overlaps by no more than a prescribed loss tolerance with the confidence interval having the highest lower bound.

Example 14: The method of example 12 or example 13, wherein the sampling schedules associated with the machine-learning configurations increase at least a sample size of the sampled training dataset over repeated training of a same machine-learning configuration.

Example 15: The method of any one of examples 12-14, wherein selecting the machine-learning configuration comprises, for at least some iterations, identifying a machine-learning configuration having a highest upper bound of its associated confidence interval, and, if a training cost gradient of the identified machine-learning configuration is below a sum of training cost gradients of the other machine-learning configurations, selecting the identified machine-learning configuration, and otherwise selecting a machine-learning configuration having a second-highest upper bound of its associated confidence interval.

Example 16: The method of any one of examples 12-15, wherein the confidence interval is determined based further on sample sizes of the sampled training dataset and the sampled test dataset.

Example 17: The method of any one of examples 12-16, wherein the set of machine-learning configurations is iteratively pruned until it consists of only one remaining machine-learning configuration.

Example 18: A system comprising: one or more hardware processors configured to implement a plurality of processing components for determining an approximate best machine-learning configuration among a set of machine-learning configurations, the processing components comprising: a training and test component configured to train, upon selection of one of the machine-learning configurations within the set, the selected machine learning configuration on a sampled training dataset, and to compute training and test quality metrics associated with the trained machine-learning configuration; and a sampling and scheduling component configured to compute confidence intervals for the machine-learning configurations from the training and test quality metrics, to iteratively prune the set of machine-learning configurations based on the confidence intervals, to select machine-learning configurations for training by the training and test component, and to determine, for the selected machine-learning configurations, associated sample sizes for the sampled training dataset.

Example 19. The system of example 18, wherein the processing components further comprise: a data sampler configured to sample a training dataset based on the sample sizes determined by the sampling and scheduling component for the selected machine-learning configurations.

Example 20. The system of example 18 or example 19, wherein the sampling and scheduling component determines the sample sizes for each of the machine-learning configurations based on a predetermined progressive sampling schedule associated with that machine-learning configuration.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. One or more non-transitory machine-readable media storing instructions for execution by one or more hardware processors, execution of the instructions causing the one or more hardware processors to determine an approximate best machine-learning configuration among a set of machine-learning configurations by performing operations comprising:

selecting a machine-learning configuration within the set of machine-learning configurations for training and determining an associated sample size for training;

causing a training dataset to be sampled in accordance with the determined associated sample size to obtain a sampled training dataset;

causing the selected machine-learning configuration to be trained on the sampled training dataset to optimize a training value of a quality metric;

causing the trained machine-learning configuration to be tested on at least a sample of a test dataset to determine a test value of the quality metric;

estimating, based at least in part on the training value of the quality metric and the test value of the quality metric, a confidence interval providing upper and lower bounds for the quality metric, the upper bound being computed from the training value but not the test value, and the lower bound being computed from the test value but not the training value; and pruning the set of machine-learning configurations based on comparisons between the estimated confidence interval of the trained selected machine-learning configuration and estimated confidence intervals of other machine-learning configurations within the set of machine-learning configurations.

2. The one or more machine-readable media of claim 1, wherein the selecting, causing, estimating, and pruning operations are performed iteratively.

3. The one or more machine-readable media of claim 2, wherein the approximate best machine-learning configuration is a last machine-learning configuration remaining within the set of machine-learning configurations upon iterative pruning.

4. The one or more machine-readable media of claim 2, wherein, for each of the machine-learning configurations, the associated sample sizes increase progressively over repeated training iterations.

5. The one or more machine-readable media of claim 4, wherein the associated sample sizes increase geometrically over repeated training iterations.

6. The one or more machine-readable media of claim 1, wherein the test value of the quality metric is determined for the trained machine-learning configuration based on a sampled test dataset.

7. The one or more machine-readable media of claim 1, wherein the upper bound of the estimated confidence interval is greater than the training value and the lower bound of the estimated confidence interval is smaller than the test value.

8. The one or more machine-readable media of claim 1, wherein the quality metric measures an accuracy of predictions made by the trained machine-learning configuration.

9. The one or more machine-readable media of claim 1, wherein pruning the set of machine-learning configurations comprises determining, among lower bounds of the confidence intervals of the machine-learning configurations within the set of machine-learning configurations, a highest lower bound, and removing any machine-learning configuration from the set of machine-learning configurations whose confidence interval has an upper bound that exceeds the highest lower bound by no more than a prescribed loss tolerance.

10. The one or more machine-readable media of claim 1, wherein selection of a machine-learning configuration for training is based at least in part on training costs associated with reducing the confidence intervals of the machine-learning configurations within the set of machine-learning configurations.

11. The one or more machine-readable media of claim 1, wherein the approximate best machine-learning configuration is one of one or more machine-learning configurations remaining within the pruned set when a time limit has been reached.

12. A method comprising:
iteratively pruning a set of machine-learning configurations based on a training dataset and a test dataset by using one or more hardware processors to perform operations comprising, in each of a plurality of iterations:
sampling the training and test datasets in accordance with a sampling schedule associated with a machine-learning configuration selected from the set of machine-learning configurations;
training the selected machine-learning configuration based on the sampled training dataset and determining a training accuracy associated with the trained selected machine-learning configuration;
evaluating the trained selected machine-learning configuration based on the sampled test dataset to determine a test accuracy associated with the trained selected machine-learning configuration;
determining a confidence interval associated with the trained selected machine-learning configuration based at least in part on the training accuracy and the test accuracy, the confidence interval providing estimated upper and lower bounds of an accuracy, the upper bound being computed from the training accuracy but not the test accuracy, and the lower bound being computed from the test accuracy but not the training accuracy;
pruning the set of machine-learning configurations based on comparisons between the determined confidence interval and confidence intervals associated with other machine-learning configurations within the set of machine-learning configurations; and
selecting one of the machine-learning configurations remaining within the pruned set for a next iteration.

13. The method of claim 12, wherein pruning the set of machine-learning configurations comprises comparing, among the confidence intervals associated with the machine-learning configurations within the set of machine-learning configurations, a confidence interval having a highest lower bound against all other confidence intervals, and removing from the set of machine-learning configurations any machine-learning configuration whose associated confidence interval overlaps by no more than a prescribed loss tolerance with the confidence interval having the highest lower bound.

14. The method of claim 12, wherein the sampling schedules associated with the machine-learning configurations increase at least a sample size of the sampled training dataset over repeated training of a same machine-learning configuration.

15. The method of claim 12, wherein selecting the machine-learning configuration comprises, for at least some iterations, identifying a machine-learning configuration having a highest upper bound of its associated confidence interval, and, if a training cost gradient of the identified machine-learning configuration is below a sum of training cost gradients of the other machine-learning configurations, selecting the identified machine-learning configuration, and otherwise selecting a machine-learning configuration having a second-highest upper bound of its associated confidence interval.

16. The method of claim 12, wherein the confidence interval is determined based further on sample sizes of the sampled training dataset and the sampled test dataset.

17. The method of claim 12, wherein the set of machine-learning configurations is iteratively pruned until it consists of only one remaining machine-learning configuration.

18. A system comprising:
one or more hardware processors configured to implement a plurality of processing components for determining an approximate best machine-learning configuration among a set of machine-learning configurations, the processing components comprising:
a training and test component configured to, upon selection of one of the machine-learning configurations within the set of machine-learning configurations and determination of a sample size associated with the machine-learning configuration:
cause a training dataset to be sampled in accordance with the sample size associated with the machine-learning configuration to obtain a sampled training dataset,
train the selected machine learning configuration on the sampled training dataset to optimize a training value of a quality metric, and
cause the trained machine-learning configuration to be tested on at least a sample of a test dataset to determine a test value of the quality metric; and
a sampling and scheduling component configured to:
compute, from the training value of the quality metric and the test value of the quality metric, a confidence interval providing upper and lower bounds for the quality metric, the upper bound being computed from the training value but not the test value, and the lower bound being computed from the test value but not the training value, and
iteratively select machine-learning configurations for training by the training and test component and determine associated sample sizes for the selected machine-learning configurations, and prune the set of machine-learning configurations based on confidence intervals computed from training and test values of the quality metric determined by the training and test component.

19. The system of claim 18, wherein the processing components further comprise:
a data sampler configured to sample the training dataset based on the sample sizes associated with the selected machine-learning configurations.

20. The system of claim 18, wherein the sampling and scheduling component determines the sample sizes associated with each of the machine-learning configurations based on a predetermined progressive sampling schedule associated with that machine-learning configuration.

* * * * *